United States Patent [19]
Ainscough

[11] Patent Number: 5,908,526
[45] Date of Patent: Jun. 1, 1999

[54] PROCESS OF MANUFACTURING A LAMINATED PRODUCT

[75] Inventor: Anthony Norbert Ainscough, South Wales, United Kingdom

[73] Assignee: Koninklijke Emballage Industrie Van Leer B.V., Amstelveen, Netherlands

[21] Appl. No.: 08/981,765

[22] PCT Filed: Jun. 20, 1996

[86] PCT No.: PCT/DE96/00252

§ 371 Date: Feb. 4, 1998

§ 102(e) Date: Feb. 4, 1998

[87] PCT Pub. No.: WO97/00782

PCT Pub. Date: Jan. 9, 1997

[51] Int. Cl.$^6$ .................................................. B32B 31/00
[52] U.S. Cl. ..................... 156/272.2; 156/275.5; 156/307.7; 427/388.2; 427/391; 427/394; 427/397; 427/408; 427/404; 427/419.1
[58] Field of Search ................................ 156/272.2, 330, 156/248, 332, 234, 240, 241, 275.5, 307.7; 427/64, 54.1, 385.5, 408, 388.2, 391, 393, 394, 397, 419.1, 404

[56] References Cited

U.S. PATENT DOCUMENTS

| 3,847,654 | 11/1974 | Althouse et al. | 117/123 |
| 4,119,479 | 10/1978 | Williams Jr. et al. | 156/272 |
| 4,457,718 | 7/1984 | Lerner | 434/98 |
| 4,748,087 | 5/1988 | Davidson et al. | 428/463 |
| 5,487,927 | 1/1996 | Kamen et al. | 128/34.4 |
| 5,520,973 | 5/1996 | Kamen et al. | 428/35.7 |
| 5,708,047 | 1/1998 | Kamen et al. | 522/31 |

*Primary Examiner*—Merrick Dixon
*Attorney, Agent, or Firm*—Young & Thompson

[57] ABSTRACT

A process of manufacturing a laminated product, comprises the steps of: providing a carrier film; coating the film with a lacquer; applying a metal layer to the lacquer on the carrier film; applying a protective coating material to the metal layer; curing the protective coating material using UV-light (or EB radiation); applying a water based adhesive to the protective coating layer; applying a water permeable substrate to the adhesive layer; and removing the carrier film.

11 Claims, 1 Drawing Sheet

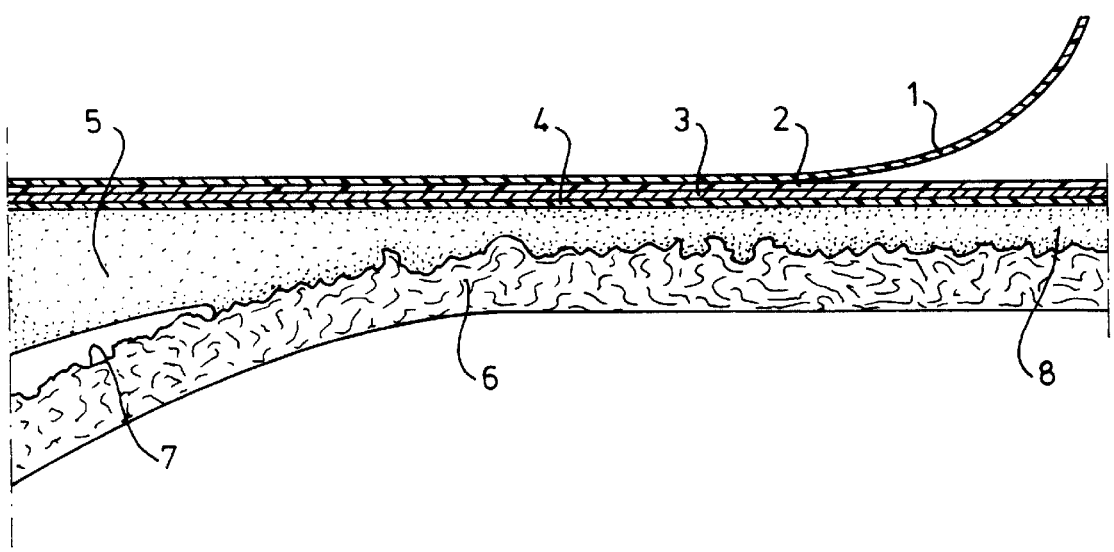

PROCESS OF MANUFACTURING A LAMINATED PRODUCT

FIELD OF THE INVENTION

The invention relates to the field of manufacturing laminated products, in particular high gloss sheets having particular barrier properties. Such sheet products are used for instance as labels, wrappings etc.

BACKGROUND OF THE INVENTION

Widely used manufacturing process is transfer metallizing. This process employs the stages of coating a carrier film, metallizing the coating, laminating the coated, metallized carrier film to a substrate, and finally removing the carrier film from the substrate. Such a transfer metallizing process is described in U.S. Pat. No. 4,344,998. The substrate is adhered to the coated, metallized carrier film by means of a so-called dry adhesive, that is an adhesive which had been dissolved in an organic solvent.

After application of this adhesive, the solvent has to be evaporated by means of drying ovens. Subsequently, the dried adhesive is brought into contact with the substrate, is then allowed to cure in such a way that finally, after the adhesive is hard enough, the carrier film can be removed.

This known process has several disadvantages. First of all, the dried adhesive is not very mobile. This means that it cannot provide good penetration and thereby adherence to a rough surface, such as uncoated paper or board, because it is difficult to penetrate such irregularly shaped surface due to its very high viscosity after evaporation of the solvent.

Moreover the adhesive takes time to harden before the carrier film can be separated from the product. Only after such time has elapsed, is it possible to check whether the bond between substrate and metal layer is strong enough. This of course represents an economic disadvantage.

It is also known to use a so-called wet adhesive, that is a water based adhesive. Such a process is described in GB-A-2006109. The water based adhesive is applied to the coated, metallized carrier film and subsequently the substrate is laminated without drying the adhesive. The substrate must have an absorbent character, such as board or paper, which absorbs the water from the adhesive.

This process has the advantage that the adhesive is hard as soon as the water is absorbed by the substrate. Thereby, the carrier film can be removed even in-line, directly after laminating the substrate. Moreover, relatively cheap uncoated and/or recycled papers and boards can be used in this process, thus giving high quality products with high internal strength at high production speeds, and at low cost.

The disadvantage of this process however is that it cannot provide very good barrier properties, in particular with respect to gasses. First of all, the rough, uncoated surface of the papers and boards used causes the metal layer to become distorted and broken up. Moreover, the papers and boards, due to the composition of cellulose fibers, are greatly affected by changes in humidity. As the humidity increases, the paper or board expands; as the humidity decreases, they contract. As a result, the metal layer is caused to break leading to a loss of barrier properties.

SUMMARY OF THE INVENTION

The object of the invention is to provide a process for manufacturing such paper or board based product which still have the desired barrier properties, while maintaining the high gloss appearance thereof. According to the invention, a process of manufacturing a laminated product is provided, comprising the steps of:

providing a carrier film, coating the film with a lacquer, applying a metal layer to the lacquer on the carrier film, applying a protective coating material to the metal layer, curing the protective coating material, applying a water based adhesive to the protective coating layer, applying a water permeable substrate to the adhesive layer, and removing the carrier film.

The protecting coating layer protects the metal layer from the dimensional changes which occur in the substrate as a result of the varying humidity thereof. Thus, the barrier function of the metal layer can be maintained; moreover, the protective coating itself provides additional barrier properties.

Preferably, the coating material is cured by means of UV-light or EB radiation.

Curing the protecting coating layer by means of UV-light (or EB radiation) ensures a rapid process step. This is enhanced by the fact that only a small amount of coating has to be applied on the very smooth metal layer.

As soon as the substrate is applied to the carrier film, the water penetrates into the surface thereof. As a result, the adherence of the substrate takes place in a very rapid manner, and directly thereafter the carrier film can be removed.

The release agent can be a lacquer with a zero contact angle.

In order to obtain even better barrier properties, preferably the carrier film consists of polyester. The surface smoothness of the polyester film is copied onto the metal layer, resulting in excellent barrier properties of the latter.

BRIEF DESCRIPTION OF THE DRAWINGS

The process according to the invention will be explained further with reference to the drawing.

The FIGURE depicts a laminated product according to the invention.

DETAILED DESCRIPTION OF THE INVENTION

In the drawing, a carrier film 1 is shown, which in a first process step is provided with a release layer 2. Onto this release layer 2, metal layer 3 has been applied by means of a vacuum depositing process.

Subsequently, a protecting coating 4 is coated and cured onto the metal layer 3, whereafter wet adhesive 5 is applied onto the protecting coating. A suitable amount of adhesive is 4–6 grams per square meter.

Thereafter, a paper or board sheet 6 is laminated onto the adhesive. The wet adhesive easily penetrates into the rough surface 7 of the paper or board substrate 6. Immediately the liquid such as water migrates into the paper or board material, leaving a dry adhesive 8 which provides the required bonding strength.

As a result, directly after applying the substrate 6, the carrier film may be removed as indicated at 9. Thus, it is possible to remove the carrier film in line, resulting in an efficient and quick manufacturing procedure.

I claim:

1. Process of manufacturing a laminated product, comprising the steps of:
   providing a carrier film,
   coating the film with a lacquer,
   applying a metal layer to the lacquer on the carrier film,
   applying a protective coating material to the metal layer,
   curing the protective coating material,
   applying a water based adhesive to the protective coating layer,
   applying a water permeable substrate to the adhesive layer, and
   removing the carrier film.

2. Process according to claim 1, whereby the protective coating is cured by means of UV-light or electron beam (EB) radiation.

3. Process according to claim 1, wherein the substrate is a paper or board.

4. Process according to claim 1, wherein the lacquer has a zero contact angle.

5. Process according to claim 1, wherein the carrier film consists of polyester.

6. Process according to claim 2, wherein the substrate is a paper or board.

7. Process according to claim 2, wherein the lacquer has a zero contact angle.

8. Process according to claim 3, wherein the lacquer has a zero contact angle.

9. Process according to claim 2, wherein the carrier film consists of polyester.

10. Process according to claim 3, wherein the carrier film consists of polyester.

11. Process according to claim 4, wherein the carrier film consists of polyester.

* * * * *

UNITED STATES PATENT AND TRADEMARK OFFICE
CERTIFICATE OF CORRECTION

PATENT NO. : 5,908,526
DATED : June 1, 1999
INVENTOR(S) : Anthony Norbert AINSCOUGH It is certified that error appears in the above-identified patent and that said Letters Patent is hereby corrected as shown below:

On the title page, add the following:

--[30]   Foreign Application Priority Data
June 20, 1995    [NL]    Netherlands........1000614--.

Signed and Sealed this

Thirty-first Day of August, 1999

Attest:

Q. TODD DICKINSON

*Attesting Officer*        *Acting Commissioner of Patents and Trademarks*